United States Patent [19]

Schmidt

[11] Patent Number: 4,865,420

[45] Date of Patent: Sep. 12, 1989

[54] WOOD FOR VIDEO SCREEN

[76] Inventor: Michael R. Schmidt, 122 Neptune Ave., Hermosa Beach, Calif. 90254

[21] Appl. No.: 137,454

[22] Filed: Dec. 23, 1987

Related U.S. Application Data

[63] Continuation-in-part of Ser. No. 918,095, Oct. 10, 1986, abandoned.

[51] Int. Cl.⁴ .............................................. G02B 27/00
[52] U.S. Cl. .................................. 350/276 R; 358/252
[58] Field of Search ........................... 350/276 R, 319; 358/252

[56] References Cited

U.S. PATENT DOCUMENTS 3,109,063 10/1963 Parker .................................. 358/252
4,569,572 2/1986 Kopich ............................. 350/276 R
4,633,324 12/1986 Giulie .................................. 358/252

*Primary Examiner*—Bruce Y. Arnold
*Assistant Examiner*—Rebecca D. Gass
*Attorney, Agent, or Firm*—Brooks & Kushman

[57] ABSTRACT

A hood (10) for a video screen (12) is disclosed as comprising an elongated peripheral enclosure (16) having a mounting end (18) and a viewing end (20). The peripheral enclosure (16) includes first and second sets of opposed walls (22,24) defining an enclosed passage extending between the mounting and viewing ends (18,20). A flange (28) is mounted on the mounting end (18) of the peripheral enclosure (16) to envelope the enclosure about the video screen (12). A fastener (26) attaches the mounting end (18) to the video screen (12) with a central viewing axis X of the peripheral enclosure extending at an acute angle A in the range of about 55 degrees to 75 degrees with respect to the video screen. Peripheral enclosure (16) has a sufficient length between the mounting and viewing ends (18,20) to obstruct light rays entering the peripheral enclosure from striking the video screen (12) perpendicularly. A seal (30) as mounted at the mounting end (18) to prohibit outside light fron entering between the mounting end and the video screen (12) to provide reduced glare viewing of the screen as viewed through the viewing end (20) of the peripheral enclosure (16).

24 Claims, 2 Drawing Sheets

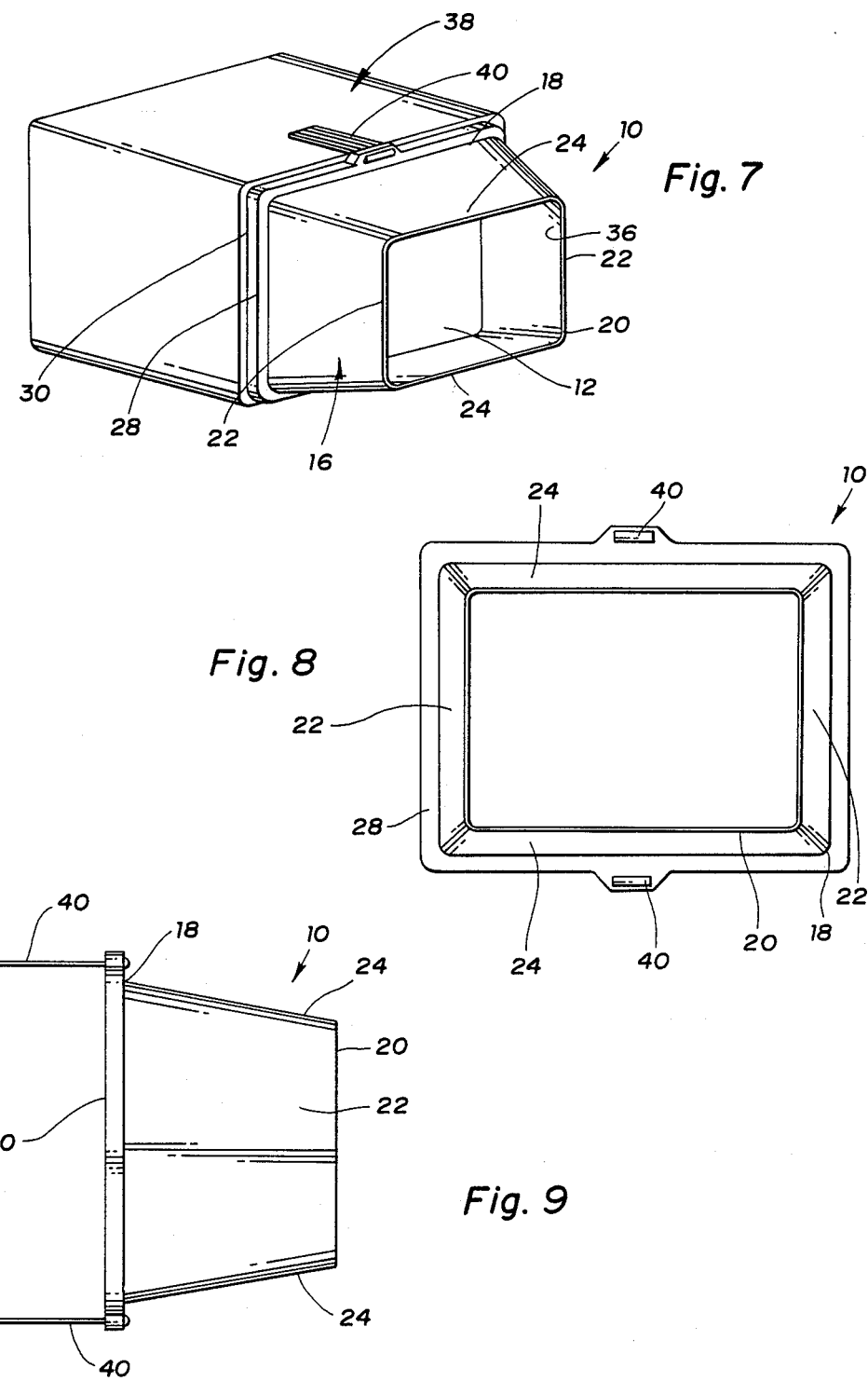

WOOD FOR VIDEO SCREEN

CROSS REFERENCE TO RELATED APPLICATION

This invention is a continuation-in-part of prior application Ser. No. 918,095 which was filed Oct. 10, 1986 now abandoned, in the name of Michael R. Schmidt.

TECHNICAL FIELD

This invention relates to glare eliminating hoods for video screens.

BACKGROUND ART

Today video screens are used to provide a wide array of information to a viewer. Daily encounters with video screens include viewing television and CRT screens to viewing video screens that display radar information. Often times lighting conditions create a condition referred to as glare whereby surrounding light striking the video screen is reflected off the video screen in a harsh or offensive way thereby obstructing the view.

For example, portable televisions with self-contained power supplies have recently become increasingly popular and affordable. Televisions have become so small that they can even be worn on a watchband but more often they are of a size that is capable of being comfortably hand held. Oftentimes the viewer of one of these portable televisions will be viewing the video screen while situated in an outdoor environment such as at the beach or at a sporting event. These viewers have become familiar with and annoyed by the glare associated with this outdoor viewing. In an effort to eliminate this glare, some viewers use their hand to shade the video screen from sunlight, while others constantly change the position of the video screen. Although shading and changing the relative position of the video screen may help reduce glare, these solutions are temporary and inconvenient.

Another example of annoying glare is found in an office environment where work station lighting is used to illuminate a discrete work location including a CRT display. In this environment, the lighting typically produces glare on the CRT screen. The disclosures of U.S. Pat. Nos. 4,569,572 and 4,444,465 to Kopich and Guilie et al. respectively have attempted to eliminate this type of glare by providing a visor to reduce the glare associated with lighting from above. However neither disclosure provides a solution for eliminating the most common type of glare, i.e. glare associated with reflection of light from the work surface.

Furthermore, glare is also experienced frequently when navigating a boat or plane in daylight. Often the daylight reflected from the radar screens and other visual instruments obscures the viewers vision.

DISCLOSURE OF INVENTION

An object of the present invention is to provide a hood for video screens that eliminates the annoying glare often associated with viewing video screens under adverse lighting conditions.

In carrying out the above object and other objects of the invention, a video screen hood constructed in accordance with the invention comprises an elongated peripheral enclosure having a mounting end and a viewing end. The peripheral enclosure includes first and second sets of opposed walls defining an enclosed passage extending between the mounting and viewing ends. A fastener on the mounting end of the peripheral enclosure attaches the peripheral enclosure about the video screen to provide reduced glare viewing of the screen as the screen is viewed through the viewing end of the peripheral enclosure.

In a preferred embodiment, the first and second set of walls generally define a rectangular cross section to accommodate the generally rectangular configuration of a television screen although the peripheral enclosure can have any cross section that corresponds to the shape of the screen being hooded. The mounting end of the peripheral enclosure preferably includes a flange of a corresponding peripheral enclosure shape to envelope the peripheral enclosure about the video screen. Most preferably the flange includes a seal to prohibit outside light from entering between the mounting end and the video screen. The seal is made of any compressible material and the use of rubber-like materials is especially preferred.

In the preferred embodiment, the peripheral enclosure is generally of a tapered shape and the shape of the taper is dictated by the lighting conditions. In one arrangement the taper provides for decreasing cross section area from the viewing end to the mounting end. In another arrangement, the taper provides for decreasing cross section area from the mounting end to the viewing end.

The fastener includes a strap for attaching the peripheral enclosure to the video screen. In one embodiment, the strap is an elastic fastening strip attached to the flange to secure the mounting end of the peripheral enclosure securely about the video screen. In another preferred embodiment, the strap includes a plurality of hooks and loops commonly known as is a VELCRO ® fastening strip attached to the flange.

Also, the peripheral enclosure has a central viewing axis that extends at an acute angle to the plane on the video screen. Preferably, the acute angle A between the central viewing axis and the plane of the video screen is in the range of about 55° to 75°. In the most preferred construction, the acute angle A is about 65°.

Furthermore, the peripheral enclosure has a length L between the mounting end and the viewing end of sufficient length to obstruct light rays entering the peripheral enclosure at the viewing end from striking the video screen perpendicularly. Preferably, the length L between the mounting and viewing ends is at least the height of the screen divided by the cosine of acute angle A between the central viewing axis and the plane of the video screen.

The peripheral enclosure has an inside surface of a light absorbing color to reduce the reflection of light within the peripheral enclosure. In the most preferred construction, the inside surface is black.

Preferably the peripheral enclosure is made from plastics material although the aforementioned hoods can be made from other materials.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 7 is a perspective view of a hood for a CRT screen constructed in accordance with the present invention and illustrated in an attached position about a video screen of a computer reader.

FIG. 8 is a frontal view of the hood shown in FIG. 7 illustrating a flange; and

FIG. 9 is a side view of the hood shown in FIG. 7 illustrating the tapered shape of the hood.

BEST MODES FOR CARRYING OUT THE INVENTION

Referring to FIG. 1 through 6 of the drawings, one embodiment of a video screen hood 10 constructed in accordance with the present invention is shown for use with a video screen 12 having a height H and a width W. As illustrated, the video screen 12 is displayed on a small portable television 14 and the hood 10 provides reduced-glare viewing of the television. As is hereinafter more fully described, the hood 10 is especially useful for outside viewing of any video screen 12 such as at the beach or at sporting events.

Figure 1:
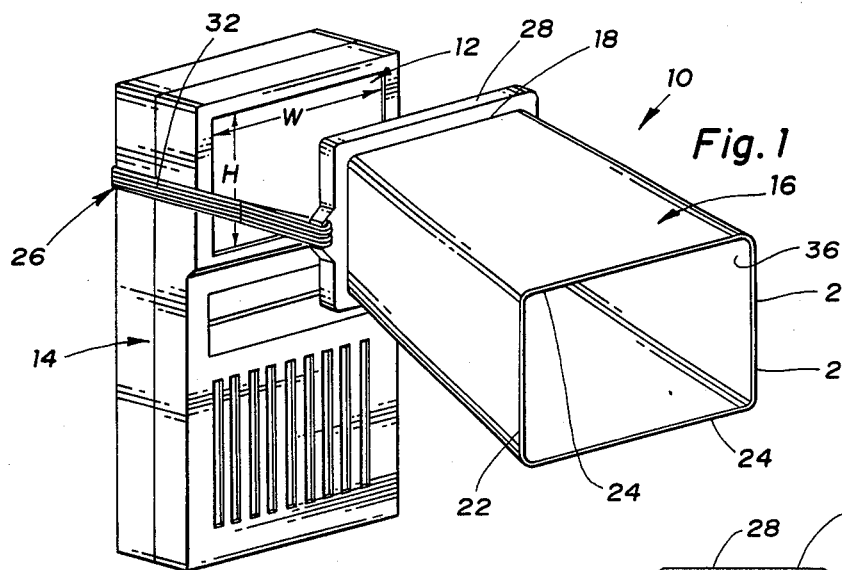
FIG. 1 is a perspective view of a hood for a video screen constructed in accordance with the present invention and illustrated in a semi attached position about a video screen of a portable television.

As shown in FIG. 1, the hood 10 comprises an elongated peripheral enclosure 16 having a mounting end 18 and a viewing end 20. The peripheral enclosure includes first and second sets of opposed walls 22,24 defining an enclosed passage of an extending tapered shape between the mounting and viewing ends 18,20. The taper provides for decreasing cross section area from the viewing end 20 to the mounting end 18. A fastener 26 attaches the mounting end 18 of the peripheral enclosure 16 about the video screen 12 to provide reduced-glare viewing of the screen as the screen is viewed through the viewing end 20 of the peripheral enclosure.

FIG. 1 illustrates the peripheral enclosure 16 as having a generally rectangular cross section that corresponds to the shape of video screen 12 although the hood can be made to correspond to any video screen shape including circular shaped screens. Mounting end 18 includes a flange 28 of the corresponding peripheral enclosure shape to envelope the peripheral enclosure 16 about video screen 12.

Figure 3:
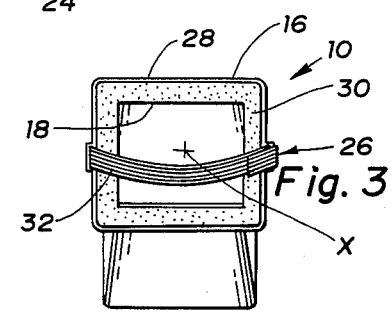
FIG. 3 is an elevational view taken along the direction of line 3—3 in FIG. 2 showing a mounting end of the hood having a flange and a seal.
Figure 4:
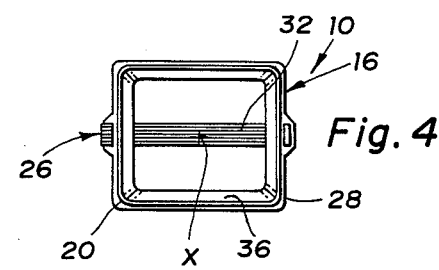
FIG. 4 is a view taken along the direction of line 4—4 in FIG. 2 illustrating the viewing end of the hood peripheral enclosure.

In the embodiment shown in FIG. 3, the flange 28 includes a seal 30 mounted on the flange 28 to prohibit outside light from entering between the mounting end 18 of the peripheral enclosure 16 and the video screen 12. The seal 30 is made of a compressible material to provide sealing engagement about the video screen 12, and the seal is preferably a rubber-like material to provide best results.

As illustrated in FIGS. 1 through 6, the fastener 26 includes a strap 32 for attaching the peripheral enclosure 16 to the video screen 12. In one embodiment, the strap 32 is an elastic fastening strip having opposite ends attached to opposite sides of the flange 28. The strap 32 is stretched about television 14 to secure the hood 10 about the screen 12.

Figure 6:
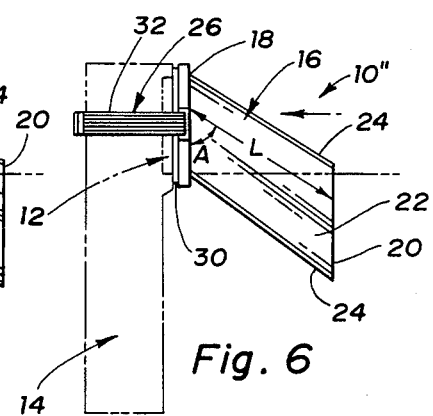
FIG. 6 is a side view of a further embodiment of the hood similar to those of FIGS. 2 and 5 but having the acute angle at about 55° such that the peripheral enclosure length can be shorter.

In the embodiment of FIG. 6, the strap 32 is made from a strip of VELCRO ®. The VELCRO ® strip includes a plurality of hooks and loops commonly known as is attached at one side of the flange 28 and the opposite end of the strip is wrapped around the television 14 and attached to the other side of the flange as shown. Use of the elastic fastening strips provide secure attachment of the peripheral enclosure 16 to the portable television 14 and the use of VELCRO ® as the fastening strip provides an unstretchable and more secure attachment.

Figure 2:
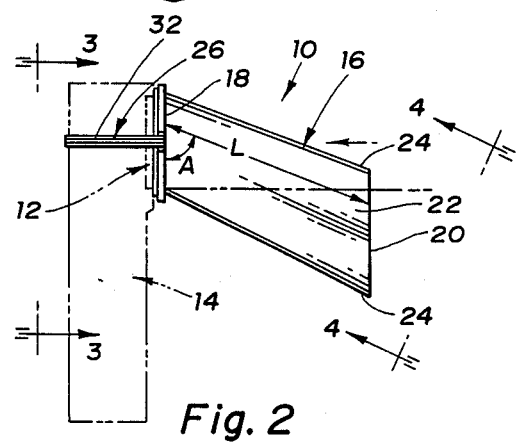
FIG. 2 is a side view illustrating the preferred construction of the hood having a central viewing axis attached to the portable television which is shown in phantom.
Figure 5:
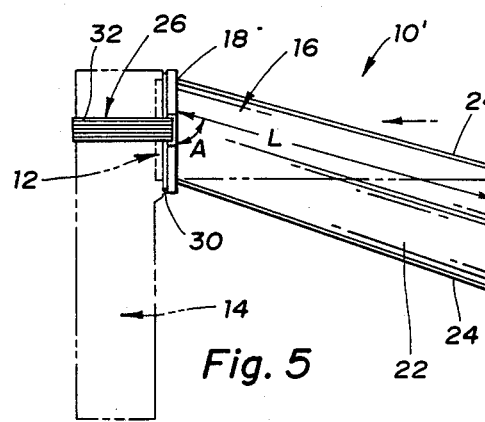
FIG. 5 is a side view of another embodiment of the hood whose central viewing axis meets the plane of the video screen at an acute angle A of about 75° necessitating a longer peripheral enclosure length than the embodiment shown in FIG. 2.

As illustrated in FIGS. 2, 5, and 6, the peripheral enclosure 16 includes a central viewing axis X that extends at an acute angle A to the plane of the video screen. The peripheral enclosure 16, shown as being angled down, can also be angled up as a matter of convenience and provide glare elimination. In the preferred embodiment of FIG. 2, the acute angle A between the central viewing axis X and the plane of the video screen is about 65°. FIG. 5 illustrates another embodiment of the hood 10, where acute angle A is about 75°. FIG. 6 illustrates yet another embodiment of the hood 10'' where acute angle A is about 55°. In each of the embodiments of FIGS. 2, 5 and 6, the peripheral enclosure 16 has a length L between the mounting end 18 and the viewing end 20 of a sufficient length to obstruct light rays entering the peripheral enclosure at the viewing end from striking the video screen 12 perpendicularly. To do so, the peripheral enclosure 16 requires a minimum length L between the mounting and viewing ends 18, 20 of at least the height H of the video screen divided by the cosine of the acute angle A formed between the central viewing axis X and the plane of the video screen.

Preferably the peripheral enclosure 16 has an inside surface 36 of a light absorbing color which is most preferably black.

In the preferred construction, the peripheral enclosure 16 is made from injection molded plastic although other materials and processes may be used. It is therefore contemplated that the peripheral enclosure 16 could be constructed in a number of ways such as pieced construction, telescoping construction and a cloth covering over a frame construction.

FIGS. 7 through 9 of the drawings illustrate a second embodiment of the hood 10 for use with a CRT screen 38. As illustrated in FIG. 1 the hood 10 includes the elongated peripheral enclosure 16 and has mounting and viewing ends 18 and 20. The peripheral enclosure 16 includes first and second sets of opposed walls 22,24 defining an enclosed passage of a tapered shape extending between the mounting and viewing ends 18,20.

Unlike the hood 10 for use on the portable television 14, the taper of the peripheral enclosure 16 for use with the CRT screen 38 provides for decreasing cross section area from the mounting end 18 to the viewing end 20. This taper, in contrast to the outwardly tapering television screen hood 10, has been found suitable where artificial lighting from above is used and in particular where work station lighting, that typically creates reflections from a work surface, is used.

FIGS. 8 and 9 illustrate that the peripheral enclosure 16 has a cross section that generally corresponds to the shape of the CRT screen 38. A flange 28 of the corresponding peripheral enclosure 16 shape envelopes the enclosure about the CRT 38. A seal 30 prohibits light from entering the peripheral enclosure 16 between the mounting end 18 and CRT screen 38. Two VELCRO ® straps 40 are shown for mounting the hood 10 to the CRT screen 38 although other mounting arrangements such as a VELCRO ® faced flange 28 and complementary VELCRO ® faced CRT screen 38 are contemplated.

The preferred construction of the CRT screen hood 10 also consists of injection molded plastic although other processes and materials can be used.

Hoods 10 constructed in accordance with the present invention can be used on any video screen and can also be used to eliminate glare on other visually perceptible surfaces.

While the best mode for carrying out the invention has been described in detail, those familiar with the art to which this invention relates will recognize various alternative designs and embodiments for practicing the invention as described by the following claims.

What is claimed is:

1. A hood for a video screen comprising: an elongated peripheral enclosure having a mounting end and a viewing end; said peripheral enclosure including first and second sets of opposed walls defining an enclosed passage extending between the mounting and viewing ends; said peripheral enclosure including a central viewing axis that extends at an acute angle generally in the range of about 55° to 75° to the plane of the video screen; said central viewing axis being defined as a line of sight generally extending through the center of said peripheral enclosure at equal distances between said first and second set of opposed walls along said viewing axis; and a fastener for attaching the mounting end of the peripheral enclosure about the video screen to provide reduced-glare viewing of the screen as the screen is viewed through the viewing end of the peripheral enclosure.

2. A hood as in claim 1 wherein said first and second set of walls generally define a rectangular cross section.

3. A hood as in claim 1 wherein said peripheral enclosure has a cross section that generally corresponds to the shape of the video screen.

4. A hood as in claim 3 wherein said peripheral enclosure is generally of a tapered shape.

5. A hood as in claim 4 wherein said taper provides for decreasing cross section area from the viewing end to the mounting end.

6. A hood as in claim 4 wherein said hood taper provides for decreasing cross section area from the mounting end to the viewing end.

7. A hood as in claim 4 wherein the mounting end includes a flange of the corresponding peripheral enclosure shape to envelope the enclosure about the video screen.

8. A hood as in claim 7 wherein the flange includes a seal to prohibit outside light from entering between the mounting end and the video screen.

9. A hood as in claim 8 wherein the seal is made of a compressible material.

10. A hood as in claim 9 wherein the fastener includes a strap for attaching the peripheral enclosure to the video screen.

11. A hood as in claim 9 wherein the strap is an elastic fastening strip attached to the flange.

12. A hood as in claim 10 wherein the strap is a VELCRO ® fastening strip attached to the flange.

13. A hood as in claim 1 wherein the acute angle A is about 65°.

14. A hood as in claim 1 wherein the peripheral enclosure has a length L between the mounting end and the viewing end of sufficient length to obstruct light rays entering the peripheral enclosure from striking the video screen perpendicularly.

15. A hood as in claim 14 wherein the peripheral enclosure has a length L between the mounting and viewing ends of at least H/cosine A.

16. A hood as in claim 15 wherein the peripheral enclosure has an inside surface of a light absorbing color.

17. A hood for a video screen comprising: an elongated peripheral enclosure having a mounting end and a viewing end; said peripheral enclosure including first and second sets of opposed walls defining an enclosed passage of a tapered shape extending between the mounting and viewing ends; said peripheral enclosure having a cross sectional shape that corresponds to the shape of the video screen; said peripheral enclosure also having a central viewing axis; a fastener for attaching the mounting end of the peripheral enclosure to the video screen with the central viewing axis extending at an acute angle in the range of about 55° to 75° with respect to the video screen; the peripheral enclosure having a sufficient length between the mounting and viewing ends to obstruct light rays entering the peripheral enclosure from striking the video screen perpendicularly; and a seal at the mounting end to prohibit outside light from entering between the mounting end and the video screen to provide reduced-glare viewing of the screen as the screen is viewed through the viewing end of the peripheral enclosure.

18. A hood for a video screen comprising: an elongated peripheral enclosure having a mounting end and a viewing end; said peripheral enclosure including first and second sets of opposed walls defining an enclosed passage of a tapered shape extending between the mounting and viewing ends; said taper providing decreasing cross section from the viewing end to the mounting end; said peripheral enclosure also having a central viewing axis; a flange on the mounting end of the peripheral enclosure to envelope the peripheral enclosure about the video screen; a VELCRO ® fastener for attaching the peripheral enclosure to the video screen with the central viewing axis extending at an acute angle A in the range of about 55° to 75° with respect to the video screen; said peripheral enclosure having a length between the mounting and viewing ends of at least H/cosine A to obstruct light rays from striking the video screen perpendicularly; the peripheral enclosure having an inside surface of a light absorbing color; and a seal of a compressible material on the flange to prohibit outside light from entering between the mounting end and the video screen to provide reduced-glare viewing of the screen as the screen is viewed through the viewing end of the peripheral enclosure.

19. A hood for a video screen comprising: an elongated peripheral enclosure having amounting end and a viewing end; said peripheral enclosure including first and second sets of opposed walls defining an enclosed passage extending between the mounting and viewing ends; and a strap including a plurality of hooks and loops mounting the mounting end of the peripheral enclosure about the video screen to provide reduced-glare viewing of the screen as the screen is viewed through the viewing end of the peripheral enclosure.

20. A hood as in claim 19 wherein said elongated peripheral enclosure is tapered, its mounting end having a larger cross section than its viewing end, thereby said peripheral enclosure obstructing a substantial amount of light rays entering the peripheral enclosure from striking the video screen perpendicularly.

21. A hood as in claim 20 further including an outwardly extending flange at its mounting end for mounting said peripheral enclosure on the video screen.

22. A hood as in claim 21 wherein said flange includes a compressible seal thereon to prevent outside light rays from entering said peripheral enclosure at the mounting end.

23. A hood as in claim 22 wherein said flange includes at least one mount for attaching a VELCRO® fastening strap for securing said peripheral enclosure about the video screen.

24. A hood for a video screen comprising: an elongated peripheral enclosure having a mounting end and a viewing end; said peripheral enclosure including first and second sets of opposed walls defining an enclosed passage extending between the mounting and viewing ends; said peripheral enclosure having a cross section that generally corresponds to the shape of the video screen; said peripheral enclosure including an outwardly extending flange at its mounting end; a compressible seal mounted on said flange to prevent light rays from entering said peripheral enclosure at the mounting end; said outwardly extending flange including at least one mount; and a strap including a plurality of hooks and loops mounting the mounting end of the peripheral enclosure about the video screen to provide reduced-glare viewing of the screen as the screen is viewed through the viewing end of the peripheral enclosure.

* * * * *

UNITED STATES PATENT AND TRADEMARK OFFICE
CERTIFICATE OF CORRECTION

PATENT NO. : 4,865,420

DATED : September 12, 1989

INVENTOR(S) : Michael R. Schmidt

It is certified that error appears in the above-identified patent and that said Letters Patent is hereby corrected as shown below:

In the title "WOOD" should be --HOOD--.

In the Abstract line 18, after "(30)" and before "mounted", "as" should be --is--;

In the title col. 1, "WOOD" should be --HOOD--.

Column 3, line 17, after "FIG. 2;" delete "and".

Column 3, line 20, after "shorter", delete "." and insert therefor--;--.

Column 3, line 25, after "reader", delete "." and insert therefor--;--.

Column 6, line 68, (claim 19) after "having" and before "end", "amounting" should be --a mounting--.

Signed and Sealed this

Twenty-third Day of October, 1990

*Attest:*

HARRY F. MANBECK, JR.

*Attesting Officer*     *Commissioner of Patents and Trademarks*